US009264680B2

(12) United States Patent
Hasegawa

(10) Patent No.: US 9,264,680 B2
(45) Date of Patent: Feb. 16, 2016

(54) APPARATUS, METHOD AND COMPUTER-READABLE RECORDING MEDIUM FOR IMPROVING VISIBILITY OF AN IMAGE PROJECTED ON A SCREEN

(75) Inventor: Fumihiro Hasegawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 252 days.

(21) Appl. No.: 13/526,657

(22) Filed: Jun. 19, 2012

(65) Prior Publication Data

US 2012/0320220 A1 Dec. 20, 2012

(30) Foreign Application Priority Data

Jun. 20, 2011 (JP) .................................. 2011-135864
Mar. 12, 2012 (JP) .................................. 2012-054969

(51) Int. Cl.
*H04N 9/31* (2006.01)

(52) U.S. Cl.
CPC ........... *H04N 9/3194* (2013.01); *H04N 9/3182* (2013.01); *H04N 9/3179* (2013.01)

(58) Field of Classification Search
CPC .. H04N 9/3194; H04N 9/3182; H04N 9/3191
See application file for complete search history.

(56) References Cited

U.S. PATENT DOCUMENTS

| 6,592,228 | B1 * | 7/2003 | Kawashima et al. | ......... 353/101 |
| 8,382,289 | B2 * | 2/2013 | Hikosaka | ................. H04N 9/31 348/744 |
| 8,427,507 | B2 * | 4/2013 | Uchida | ................. H04N 9/3194 345/629 |
| 8,659,585 | B2 * | 2/2014 | Hikosaka | ............. H04N 9/3182 345/207 |
| 8,807,762 | B2 * | 8/2014 | Uchiyama | ............... G03B 21/00 345/589 |
| 2008/0284677 | A1 * | 11/2008 | Whitehead | ............... G09G 3/20 345/1.3 |
| 2010/0134643 | A1 * | 6/2010 | Koishi | .................... G03B 29/00 348/222.1 |
| 2010/0201894 | A1 * | 8/2010 | Nakayama | ............. G03B 21/00 348/745 |
| 2010/0265403 | A1 * | 10/2010 | Hikosaka | ................. H04N 9/31 348/607 |
| 2011/0018897 | A1 * | 1/2011 | Uchiyama | ............... G03B 21/00 345/619 |
| 2011/0063324 | A1 * | 3/2011 | Uchida | ................. H04N 9/3194 345/633 |
| 2011/0169854 | A1 * | 7/2011 | Hikosaka | ............. H04N 9/3182 345/589 |

FOREIGN PATENT DOCUMENTS

| JP | 09-200440 A | 7/1997 |
| JP | 11-313346 A | 11/1999 |
| JP | 3939141 A | 4/2007 |
| JP | 3939141 B2 | 4/2007 |
| JP | 2009-042838 A | 2/2009 |

OTHER PUBLICATIONS

English language abstract for patent publication No. JP-2003-174651 which corresponds to JP-3939141-A.

* cited by examiner

*Primary Examiner* — Bao-Luan Le
(74) *Attorney, Agent, or Firm* — Harness, Dickey & Pierce

(57) ABSTRACT

An image processing apparatus includes a projecting unit configured to project an image; an image capturing unit configured to capture the projected image to generate a captured image; an area identifying unit configured to identify a high-lightness area and a low-lightness area of the captured image; and a correcting unit configured to correct a lightness of the projected image in a manner that gradually changes the lightness of the high-lightness area of the captured image obtained by projecting a white image to the lightness of the low-lightness area of the captured image and sets the lightness thus changed as the lightness of the projected image. The projecting unit projects the projected image having the corrected lightness and an image to prompt a user for a response to the change in the lightness of the projected image.

8 Claims, 13 Drawing Sheets

FIG.2
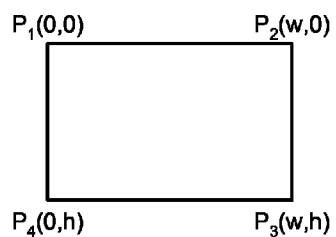
PROJECTED IMAGE
SYSTEM
(a)
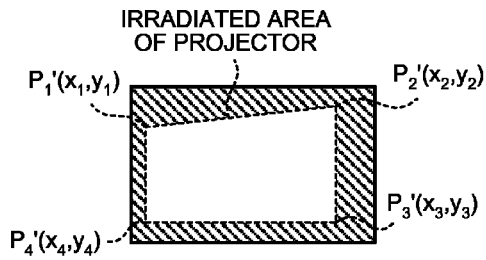
CAPTURED IMAGE
SYSTEM
(b)

FIG.5
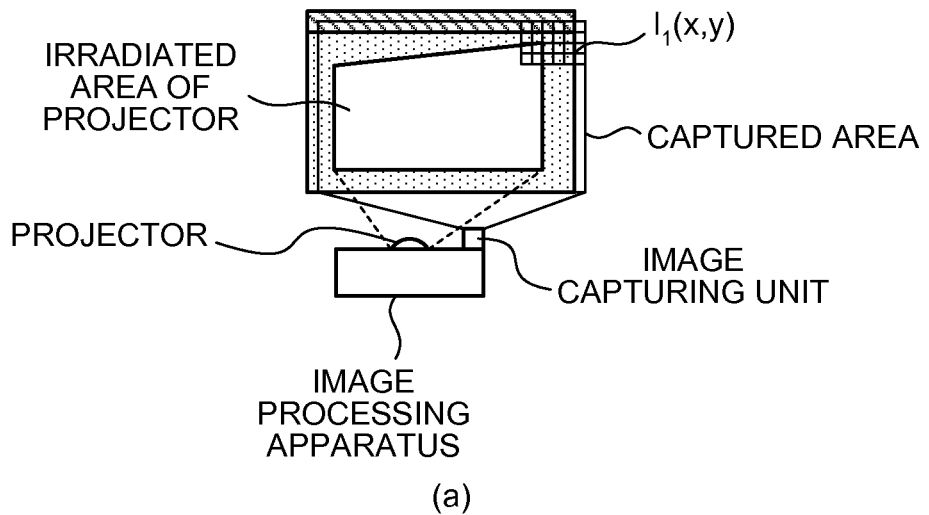
(a)
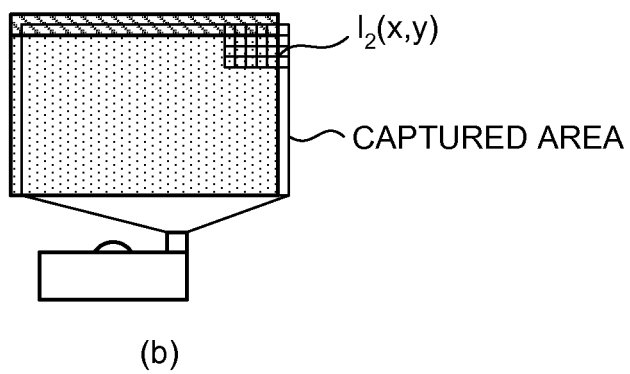
(b)
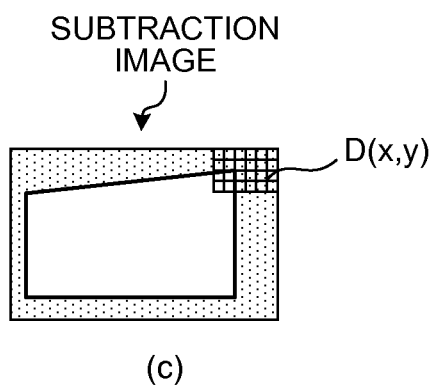
(c)

| 1/9 | 1/9 | 1/9 |
|---|---|---|
| 1/9 | 1/9 | 1/9 |
| 1/9 | 1/9 | 1/9 |

(a)

820

| 1/25 | 1/25 | 1/25 | 1/25 | 1/25 |
|---|---|---|---|---|
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |

(b)

US 9,264,680 B2

APPARATUS, METHOD AND COMPUTER-READABLE RECORDING MEDIUM FOR IMPROVING VISIBILITY OF AN IMAGE PROJECTED ON A SCREEN

CROSS-REFERENCE TO RELATED APPLICATIONS

The present application claims priority to and incorporates by reference the entire contents of Japanese Patent Application No. 2011-135864 filed in Japan on Jun. 20, 2011 and Japanese Patent Application No. 2012-054969 filed in Japan on Mar. 12, 2012.

BACKGROUND OF THE INVENTION

1. Field of the Invention

The present invention relates to an image processing apparatus, a method thereof, and a computer-readable recording medium.

2. Description of the Related Art

In business organizations, educational institutions, and administrative organizations, activities such as presentations, lessons, conferences, and lectures are performed on a daily basis by using a projection device such as a projector. A user of the projection device normally performs, for example, a presentation by projecting various images onto a white screen. However, if the images are projected while, for example, there are dirt or stains on the screen, the image projected onto the contaminated portion appears in a color different from the original color.

In this regard, Japanese Patent Application Laid-open No. H11-313346 discloses a device for inspecting a projected video image that measures an optical quantity of a projected video image by comparing an optical quantity obtained by optical sensors arranged on a screen with an optical quantity of captured data of the video image, creates correction data by comparing chromaticity and illuminance values with reference data, and corrects the chromaticity and illuminance values of a video image projection device.

However, there has been the following problem. Whether the projected image projected onto the screen is corrected in lightness in a natural manner depends on a subjective judgment of a user. The device as disclosed in Japanese Patent Application Laid-open No. H11-313346 corrects the chromaticity and illuminance values by comparing the chromaticity and illuminance values with the reference data in a standardized manner. There has been a problem that the user cannot check whether the actually performed illuminance correction is really useful. In addition, the visibility of the projected image is low.

Therefore, there is a need for an image processing apparatus which is capable of improving a usability in lightness correction of a projected image and of improving the visibility of the projected image.

SUMMARY OF THE INVENTION

It is an object of the present invention to at least partially solve the problems in the conventional technology.

According to an embodiment, there is provided an image processing apparatus that includes a projecting unit configured to project an image; an image capturing unit configured to capture the projected image to generate a captured image; an area identifying unit configured to identify a high-lightness area and a low-lightness area of the captured image; and a correcting unit configured to correct a lightness of the projected image in a manner that gradually changes the lightness of the high-lightness area of the captured image obtained by projecting a white image to the lightness of the low-lightness area of the captured image and sets the lightness thus changed as the lightness of the projected image. The projecting unit projects the projected image having the corrected lightness and an image to prompt a user for a response to the change in the lightness of the projected image.

According to another embodiment, there is provided an image processing apparatus that includes a projecting unit configured to projects an image; an image capturing unit configured to captured the projected image to generate a captured image; an area identifying unit configured to identify a high-lightness area and a low-lightness area of the captured image; and an illuminance calculating unit configured to calculate a plurality of illuminances by using an illuminance of the high-lightness area and an illuminance of the low-lightness area. The projecting unit projects an image at one of the illuminances to prompt a user for a response to the projecting the image at the one of the illuminances.

According to still another embodiment, there is provided a method performed by an information processing apparatus that processes image data. The method includes projecting a white image; capturing the projected image to generate a captured image; identifying a high-lightness area and a low-lightness area of the captured image; correcting a lightness of the projected image in a manner that gradually changes a lightness of the high-lightness area of the captured image to a lightness of the low-lightness area of the captured image; and projecting the projected image having the corrected lightness and an image to prompt a user for a response to the change in the lightness of the projected image.

According to still another embodiment, there is provided a non-transitory computer-readable storage medium with an executable program stored thereon, wherein the program instructs a processor of the information processing apparatus to perform the method according to the above embodiment.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram explaining a derivation method of coordinate transformation equations employed by the image processing apparatus;

FIG. 5 is a diagram illustrating a relationship between a lightness value of a captured image obtained by image capturing while a white image is projected, and a lightness value of a captured image obtained by image capturing while the white image is stopped being projected;

FIG. 8 is a diagram illustrating examples of a noise removal filter used by the image processing apparatus;

DETAILED DESCRIPTION OF THE PREFERRED EMBODIMENTS

Exemplary embodiments of the present invention will be described below. However, the present invention is not limited to the embodiments to be described below.

Figure 1:
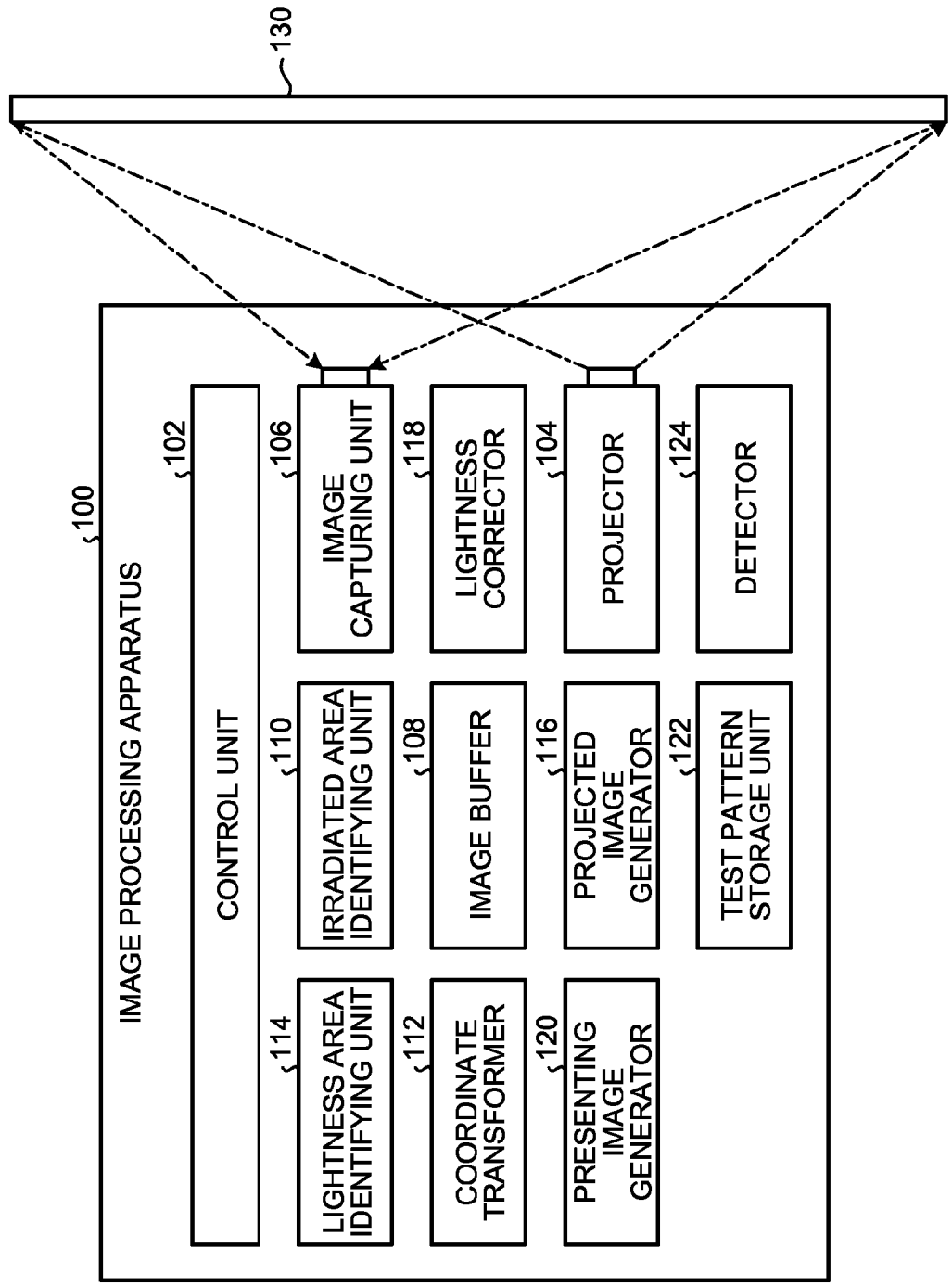
FIG. 1 is a diagram illustrating a functional configuration of an image processing apparatus according to an embodiment of the present invention.

FIG. 1 is a diagram illustrating a functional configuration of an image processing apparatus according to an embodiment of the present invention. An image processing apparatus 100 is an apparatus that projects an image acquired from an image providing device (not illustrated) onto a member, such as a screen or a whiteboard, to be projected on, and corrects the projected image. The image processing apparatus 100 is equipped with any of a variety of processors such as an MPU, and executes a computer program of the present invention written in a programming language such as an assembly language, C, C++, Java (registered trademark), JavaScript (registered trademark), Perl, Ruby, or Python, under the management of an OS such as Unix (registered trademark), Linux (registered trademark), ITRON, or µITRON.

The image processing apparatus 100 includes, for example, memory units such as a RAM that provides an execution space for running the program of the present invention and an EPROM or an EEPROM for storing, for example, the program and data in a long-lasting manner, and implements functional modules of the present embodiment in the image processing apparatus by executing the program of the present invention. In other embodiments, the image processing apparatus 100 can also implement functional modules to be described later in the image processing apparatus by being equipped with an application specific integrated circuit (ASIC) that realizes functions to be described later.

The image processing apparatus 100 is configured to include a control unit 102, a projector 104, an image capturing unit 106, and an image buffer 108.

The control unit 102 is a functional module that performs overall control of processes executed by the image processing apparatus 100. The control unit 102 performs projection and image capturing of images and various types of image processing by using the functional modules to be described later.

The projector 104 is a functional module that projects an image to be projected on the member, such as a screen 130. The projector 104 of the present embodiment is configured to include, for example, a light source such as a lamp and a projector lens, and irradiates the screen 130 with light forming an image to be projected so as to form the image onto the screen 130.

The image capturing unit 106 is a functional module that generates a captured image by collecting reflected light from an object to be captured. The image capturing unit 106 of the present embodiment is configured to include, for example, a condenser lens and imaging elements, and generates the captured image by image capturing, for example, the projected image serving as the object to be captured that is projected by the projector 104.

The image buffer 108 is a memory that buffers image data such as the captured image generated by the image capturing unit 106. After generating the captured image, the image capturing unit 106 stores the captured image in the image buffer 108 in a FIFO manner.

The image processing apparatus 100 is also configured to include an irradiated area identifying unit 110, a coordinate transformer 112, and a lightness area identifying unit 114.

The irradiated area identifying unit 110 is a functional module that identifies the area irradiated with the light from the projector 104. The irradiated area identifying unit 110 identifies the irradiated area of the projector 104 by using a captured image in the state in which the projector 104 projects onto the screen a white image having a maximum luminance and a maximum lightness, and a captured image in the state in which the projector 104 does not project the white image. The method for identifying the irradiated area will be described later in detail with reference to FIG. 3.

The coordinate transformer 112 is a functional module that derives a coordinate transformation equation for projective transformation of the captured image into the projected image, and uses a coordinate transformation equation to apply the projective transformation to the captured image. The coordinate transformer 112 derives the coordinate transformation equation by using the projected image obtained by projecting the white image described above and the irradiated area identified by the irradiated area identifying unit 110.

FIG. 2 is a diagram explaining a derivation method of the coordinate transformation equation employed by the image processing apparatus 100. The coordinate transformer 112 can derive the coordinate transformation equation by using $P_1(0, 0)$, $P_2(w, 0)$, $P_3(w, h)$, and $P_4(0, h)$ serving as coordinate values of four corners of the white image (see (a) of FIG. 2), and $P_1'(x_1, y_1)$, $P_2'(x_2, y_2)$, $P_3'(x_3, y_3)$, and $P_4'(x_4, y_4)$ serving as coordinate values of the irradiated area corresponding to those of the four corners of the white image (see (b) of FIG. 2), and also by using Equations (1).

$$X = \frac{h_1 x + h_2 y + h_3}{h_7 x + h_8 y + 1} \qquad Y = \frac{h_4 x + h_5 y + h_6}{h_7 x + h_8 y + 1} \tag{1}$$

Here, X and Y represent coordinate values in the projected image system, and x and y represent coordinate values in the captured image system.

The coordinate transformer 112 can perform the projective transformation from the captured image into the projected image, and vice versa, by using the coordinate transformation equations derived by the method described above. In the present embodiment, the coordinate transformer 112 applies the projective transformation to the captured image by using the coordinate transformation equation, and stores the results in a memory device such as the image buffer 108. Other functional modules can acquire the captured image after the projective transformation from the memory device, and use the obtained captured image, as appropriate.

The lightness area identifying unit 114 is a functional module that extracts a high-lightness area that is an area having the highest lightness in the irradiated area identified by the irradiated area identifying unit 110 and a low-lightness area that is an area having the lowest lightness in the same irradiated area. The lightness area identifying unit 114 acquires, from the image buffer 108, the image data obtained by applying the projective transformation to the captured image obtained by image capturing the white image, and applies a noise removal filter, such as a smoothing filter or a Gaussian filter, to the acquired image data. Then, the lightness area identifying unit 114 compares lightness values of all pixels constituting the image data so as to identify pixels having the lowest lightness and pixels having the highest lightness, and identifies the high-lightness area and the low-lightness area constituted by these pixels.

In the present embodiment, in order to effectively extract the low-lightness area due to dirt or the like on the member onto which an image is projected, it is preferable to identify the low-lightness area by using the captured image obtained by projecting the white image having a maximum luminance and a maximum lightness.

The image processing apparatus 100 is further configured to include a projected image generator 116, a lightness corrector 118, a presenting image generator 120, a test pattern storage unit 122, and a detector 124.

The projected image generator 116 is a functional module that generates the image data to be projected by the projector 104. The projected image generator 116 provides images, such as image data acquired from the image providing device, a test pattern, and various confirmation images and presenting images, as the projected image to the projector 104, which projects the projected image thus provided.

The lightness corrector 118 is a functional module that corrects the lightness of the projected image. The lightness corrector 118 corrects the lightness of the projected image by gradually changing the lightness of the high-lightness area included in the captured image obtained by projecting the white image, to the lightness of the low-lightness area included in the captured image.

The presenting image generator 120 is a functional module that generates image data presenting the low-lightness area. The presenting image generator 120 creates image data for notifying a user of the low-lightness area identified by the lightness area identifying unit 114, and provides the created image data to the projected image generator 116. The presenting image generator 120 generates data of an image having a shape, such as a rectangle or a circle, surrounding the low-lightness area, and superimposes a predetermined message on the thus generated image data so as to generate the image data presenting the low-lightness area. The image data presenting the low-lightness area will be described later in detail with reference to FIG. 11.

The test pattern storage unit 122 is a memory unit that stores test patterns serving as projected images projected for allowing the user to check corrected lightness levels. In the present embodiment, various types of image data, such as image patterns that can be used by the user, can be employed as the test patterns.

The detector 124 is a functional module that detects an instruction from the user. The image processing apparatus 100 is provided with an instructing unit (not illustrated) such as a button for accepting an instruction from the user, and when the user, for example, depresses the instructing unit, a signal including information for identifying the type of the instructing unit and information indicating that the instructing unit is depressed is sent to the detector 124. The detector 124 can detect the instruction from the user by receiving the signal.

Figure 3:
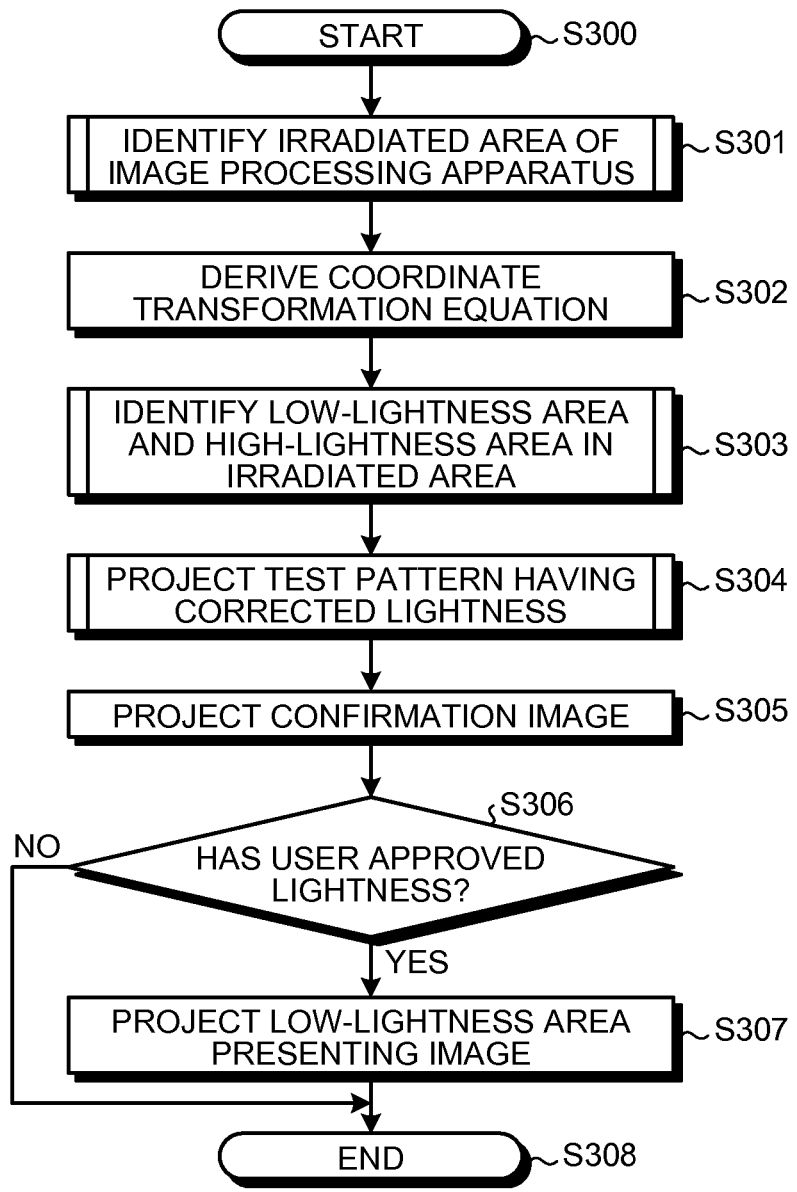
FIG. 3 is a flow chart illustrating a process executed by the image processing apparatus illustrated in FIG. 1.

FIG. 3 is a flow chart illustrating a process executed by the image processing apparatus 100 illustrated in FIG. 1. With reference to FIG. 3, description will be made below of the process executed when the image processing apparatus 100 corrects the lightness of the projected image.

The process of FIG. 3 starts at Step S300, and at Step S301, the control unit 102 of the image processing apparatus 100 identifies the irradiated area of the irradiating light of the image processing apparatus 100 by using the projector 104, the image capturing unit 106, the irradiated area identifying unit 110, and the lightness corrector 118. The details of Step S301 will be described later in detail with reference to FIG. 4.

At Step S302, the control unit 102 calls the coordinate transformer 112, which derives the coordinate transformation equation by using the captured image generated by the image capturing unit 106 at Step S301. At Step S303, the control unit 102 calls the lightness area identifying unit 114, which identifies the low-lightness area and the high-lightness area in the irradiated area. The details of Step S303 will be described later in detail with reference to FIG. 7.

Figure 10:
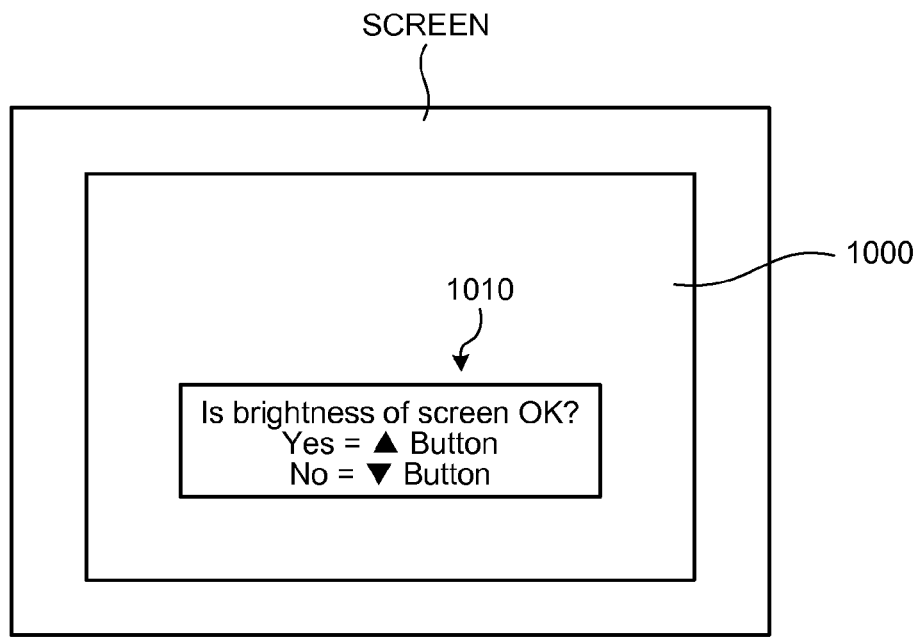
FIG. 10 is a diagram illustrating an example of a confirmation image for a user to express an intention with respect to the lightness of the projected image corrected by the image processing apparatus illustrated in FIG. 1.

At Step S304, the control unit 102 projects a test pattern having a corrected lightness level by using the lightness area identifying unit 114, the projected image generator 116, and the lightness corrector 118. At Step S305, the control unit 102 projects a confirmation image having a lightness level as illustrated in FIG. 10 by using the projector 104 and the projected image generator 116. In the present embodiment, the confirmation image for the lightness can be projected so as to be superimposed on the test pattern. The confirmation image for the lightness may also be projected after the test pattern is projected for a certain period of time.

At Step S306, it is determined whether the detector 124 has received an instruction that the user has approved the corrected lightness of the projected image. If it is determined that the user has not approved the corrected lightness (No), the process is branched to Step S308 and terminated.

On the other hand, if, in the determination at Step S306, it is determined that the user has approved the corrected lightness of the projected image (Yes), the process is branched to Step S307. At Step S307, the control unit 102 calls the projected image generator 116, which generates, in cooperation with the presenting image generator 120, a low-lightness area presenting image that serves an image representing the low-lightness area, and the projector 104 projects the image. Then, the process is terminated at Step S308.

Figure 4:
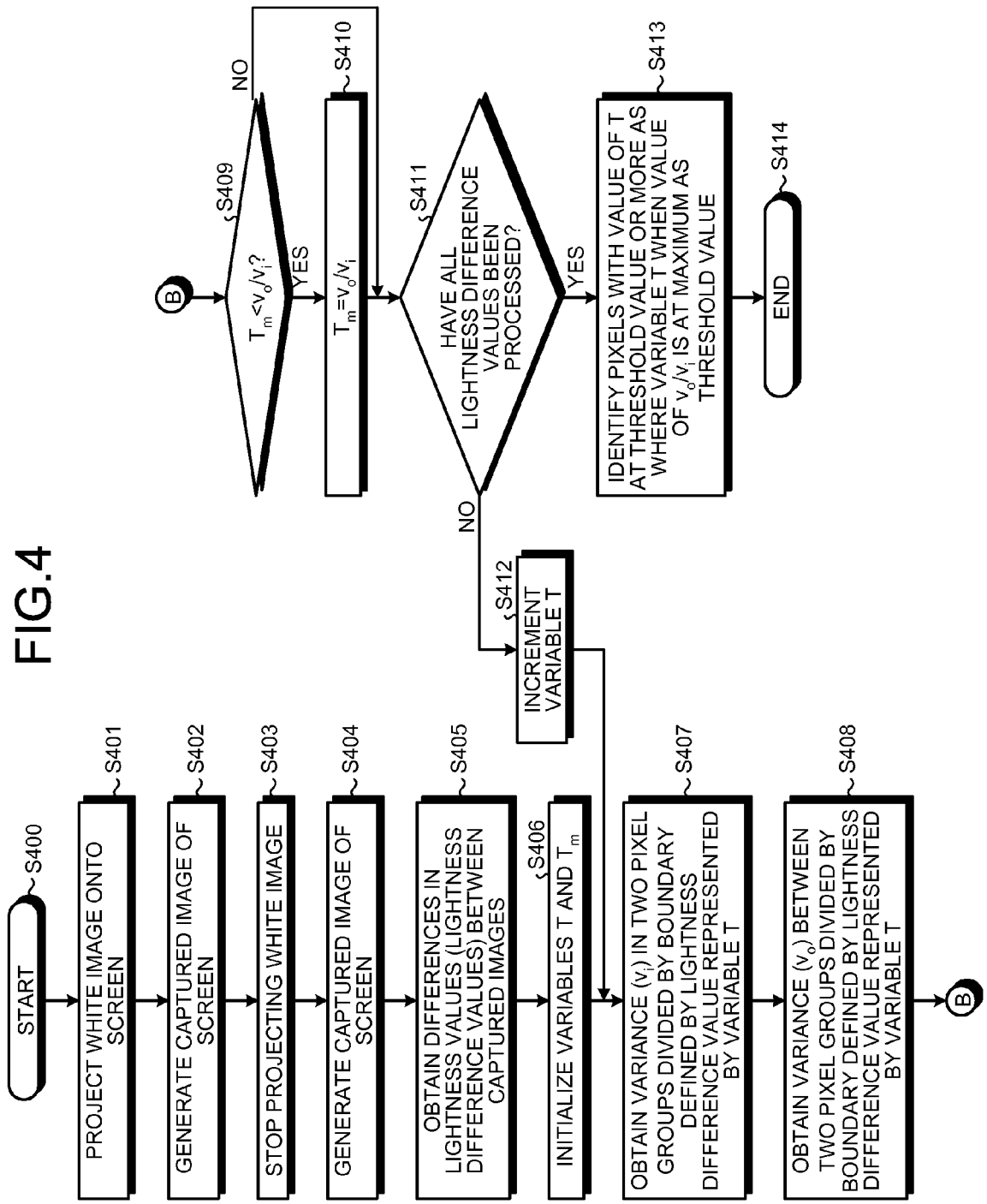
FIG. 4 is a flow chart illustrating a process executed by the image processing apparatus to identify an irradiated area.

FIG. 4 is a flow chart illustrating the process executed by the image processing apparatus 100 to identify the irradiated area. With reference to FIG. 4, description will be made below of the process of identifying the irradiated area of the image processing apparatus 100 executed at Step S301 illustrated in FIG. 3.

The process of FIG. 4 starts at Step S400, and at Step S401, the projector 104 projects the white image onto the screen. At Step S402, the image capturing unit 106 capturing an image of an area including the irradiated area of the image processing apparatus 100 and generates a captured image. At Step S403, the projector 104 stops projecting the white image. At Step S404, the image capturing unit 106 captures an image of the same area as the area captured at Step S402, and generates a captured image.

At Step S405, the irradiated area identifying unit 110 calculates every lightness difference value that is a difference between lightness values of every pair of mutually corresponding pixels constituting these captured images. In the present embodiment, the lightness difference values can be calculated by using Equation (2) given below.

$$D(x,y)=I_1(x,y)-I_2(x,y) \quad (2)$$

Here, $I_1(x, y)$ represents the lightness value of the captured image while the white image is projected (see (a) of FIG. 5), and $I_2(x, y)$ represents the lightness value of the captured image while the white image is stopped being projected (see (b) of FIG. 5). $D(x, y)$ represents the lightness difference value given by a subtraction image serving as a difference between these captured images (see (c) of FIG. 5).

In the present embodiment, the lightness value $I(x, y)$ of a captured image can be calculated by using Equation (3) given below.

$$I(x,y)=0.3 \times R+0.6 \times G+0.1 \times B \quad (3)$$

Here, R, G, and B represent luminance values of respective color components. The present embodiment employs an 8-bit color representation, and thus, the luminance of each of R, G, and B has a value from 0 to 255. Therefore, the lightness value and the lightness difference value used in the present embodiment can have a value from 0 to 255. Other embodiments can use color representations of various data sizes, such as a 16-bit color representation and a 24-bit color representation.

Figure 6:
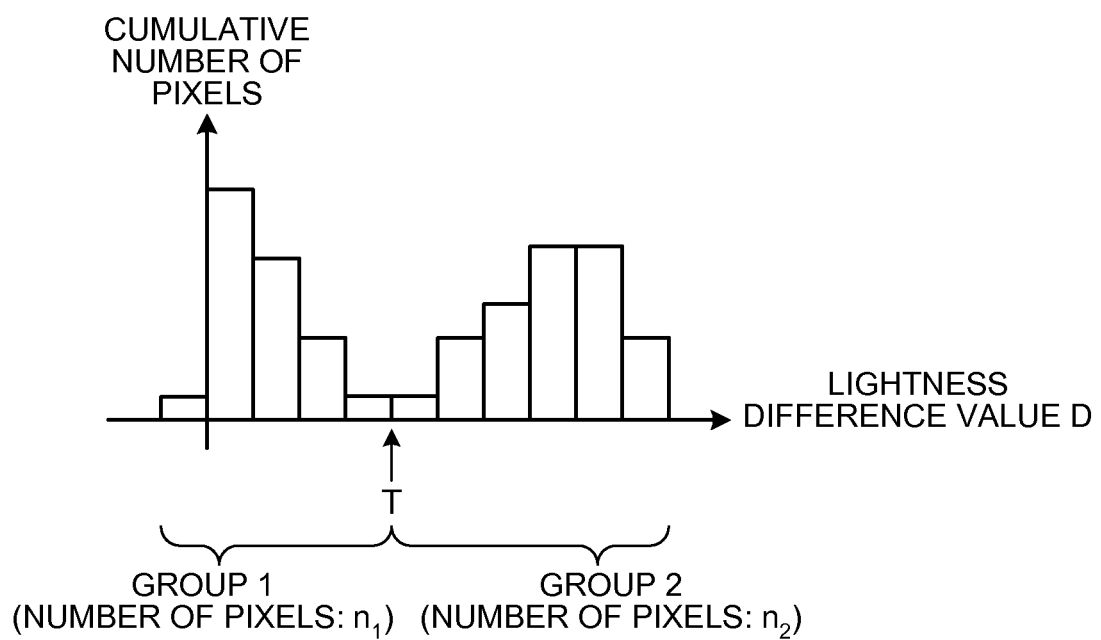
FIG. 6 is a diagram illustrating a variance in pixel groups due to lightness difference values between the captured image obtained by image capturing while white light irradiates, and the captured image obtained by image capturing while the white light is stopped irradiating.

At Step S406, the irradiated area identifying unit 110 initializes variables T and $T_m$ for obtaining the irradiated area to zero. At Step S407, the irradiated area identifying unit 110 obtains a variance ($v_i$) in two pixel groups that are divided by a boundary defined by a lightness difference value represented by the variable T, as illustrated in FIG. 6. In the present embodiment, the variance ($v_i$) in the pixel groups can be calculated by using Equation (4) given below.

$$v_i = \frac{n_1 \times v_1 + n_2 \times v_2}{n_1 + n_2} \quad (4)$$

Here, $n_1$ and $n_2$ represent the numbers of pixels belonging to the respective pixel groups divided by the variable T, and $v_1$ and $v_2$ represent variances of the lightness difference values belonging to the respective pixel groups. In the present embodiment, for example, a sample variance or an unbiased variance can be employed as the variance, and the variance of lightness difference values can be obtained from a mean value and the number of the lightness difference values of the pixels belonging to each of the pixel groups.

At Step S408, the irradiated area identifying unit 110 obtains a variance ($v_o$) between the two pixel groups that are divided by the boundary defined by the lightness difference value represented by the variable T. In the present embodiment, the variance ($v_o$) between the pixel groups can be calculated by using Equation (5) given below.

$$v_o = \frac{n_1 \times n_2 (a_1 - a_2)^2}{(n_1 + n_2)^2} \quad (5)$$

Here, $n_1$ and $n_2$ represent the numbers of pixels belonging to the respective pixel groups divided by the variable T, and $a_1$ and $a_2$ represent mean values of the lightness difference values belonging to the respective pixel groups.

At Step S409, the irradiated area identifying unit 110 determines whether the variable $T_m$ is smaller than $v_o/v_i$ at the variable T. If the variable $T_m$ is $v_o/v_i$ or more (No), the process is branched to Step S411. On the other hand, if the variable $T_m$ is smaller than $v_o/v_i$ (Yes), the process is branched to Step S410. At Step S410, the irradiated area identifying unit 110 substitutes the value of $v_o/v_i$ at the variable T for the variable $T_m$.

At Step S411, the irradiated area identifying unit 110 determines whether the process from Step S407 to Step S410 has been executed for all of the lightness difference values. If it is determines that the process has not been executed for all of the lightness difference values (No), the process is branched to Step S412, and the variable T is incremented at Step S412. On the other hand, if it is determined that the process from Step S407 to Step S410 has been executed for all of the lightness difference values (Yes), the process is branched to Step S413.

In the present embodiment, the lightness difference value can be in the range from 0 to 255. Therefore, the value f the variable T is incremented to have a value within the range from 0 to 255, and when the value of the variable T reaches the upper limit thereof, it is determined that the process has been executed for all of the lightness difference values.

At Step S413, the irradiated area identifying unit 110 assumes as a threshold value the variable T when the value of $v_o/v_i$ is at a maximum, and identifies as the irradiated area an area made up of pixels with a value of T at the threshold value or more, and the process is terminated at Step S414.

Figure 7:
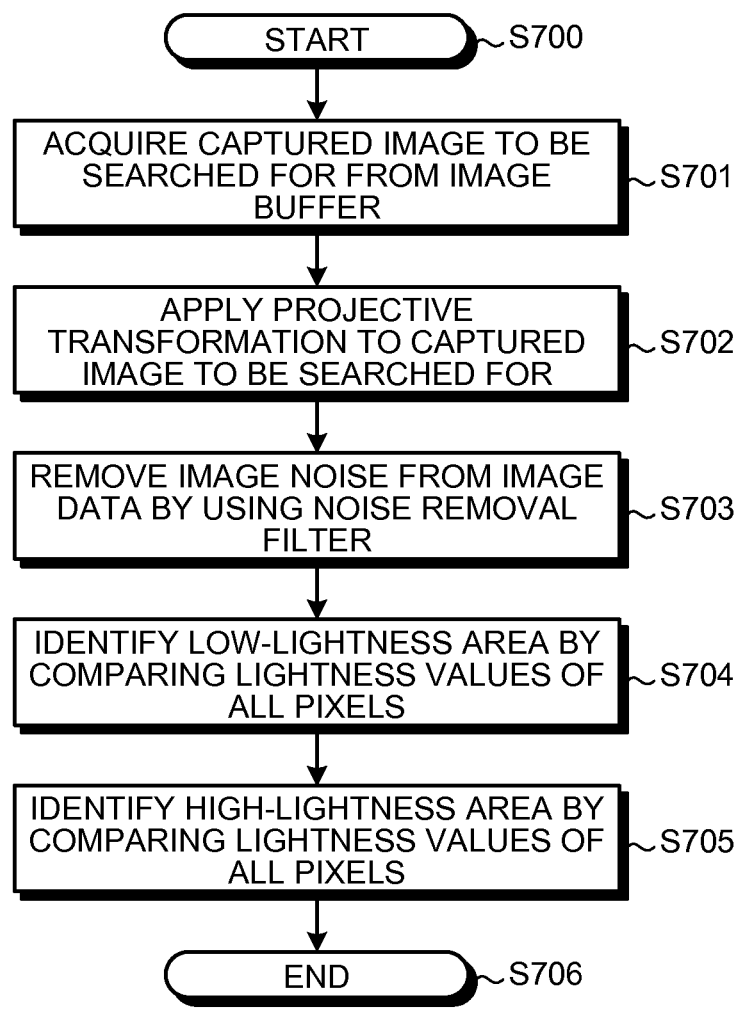
FIG. 7 is a flow chart illustrating a process in which the image processing apparatus identifies a low-lightness area in the irradiated area.

FIG. 7 is a flow chart illustrating the process in which the image processing apparatus 100 identifies the low-lightness area in the irradiated area. With reference to FIG. 7, description will be made below of the process executed at Step S303 illustrated in FIG. 3.

The process of FIG. 7 starts at Step S700, and at Step S701, the lightness area identifying unit 114 acquires from the image buffer 108 the captured image to be searched for that has been obtained by projecting the white image. At Step S702, the lightness area identifying unit 114 calls the coordinate transformer 112, which applies the projective transformation to the captured image by using the above-described coordinate transformation equation, and generates image data composed of only the irradiated area of the image processing apparatus 100. At Step S703, the lightness area identifying unit 114 removes image noise from the image data by using the noise removal filter. At Step S704, the lightness area identifying unit 114 compares the lightness values of all of the pixels constituting the denoised image data, and identifies the low-lightness area made up of pixels having the lowest lightness values. At Step S705, the lightness area identifying unit 114 compares the lightness values of all of the pixels constituting the denoised image data, and identifies the high-lightness area made up of pixels having the highest lightness values. Then, the process is terminated at Step S706.

FIG. 8 is a diagram illustrating examples of the noise removal filter used by the image processing apparatus 100. Noise removal filters 810 and 820 illustrated respectively in (a) and (b) of FIG. 8 are smoothing filters, in each of which an average value of the luminance of a center pixel that is a target pixel and of peripheral pixels is regarded as the luminance of the target pixel. For high-resolution image data, it is preferable to eliminate influences of local noise and fine points on the screen by using a noise removal filter having a large range for average value calculation. Although the examples illustrated in FIG. 8 present noise removal filters having sizes of 3×3 and 5×5, noise removal filters having other sizes can be used. In addition, other embodiments, it is also possible, as described above, to use as a noise removal filter a spatial filter such as a Gaussian filter that calculates the luminance of the target pixel by obtaining a weighted average of the luminance values of the target pixel and the peripheral pixels.

Figure 9:
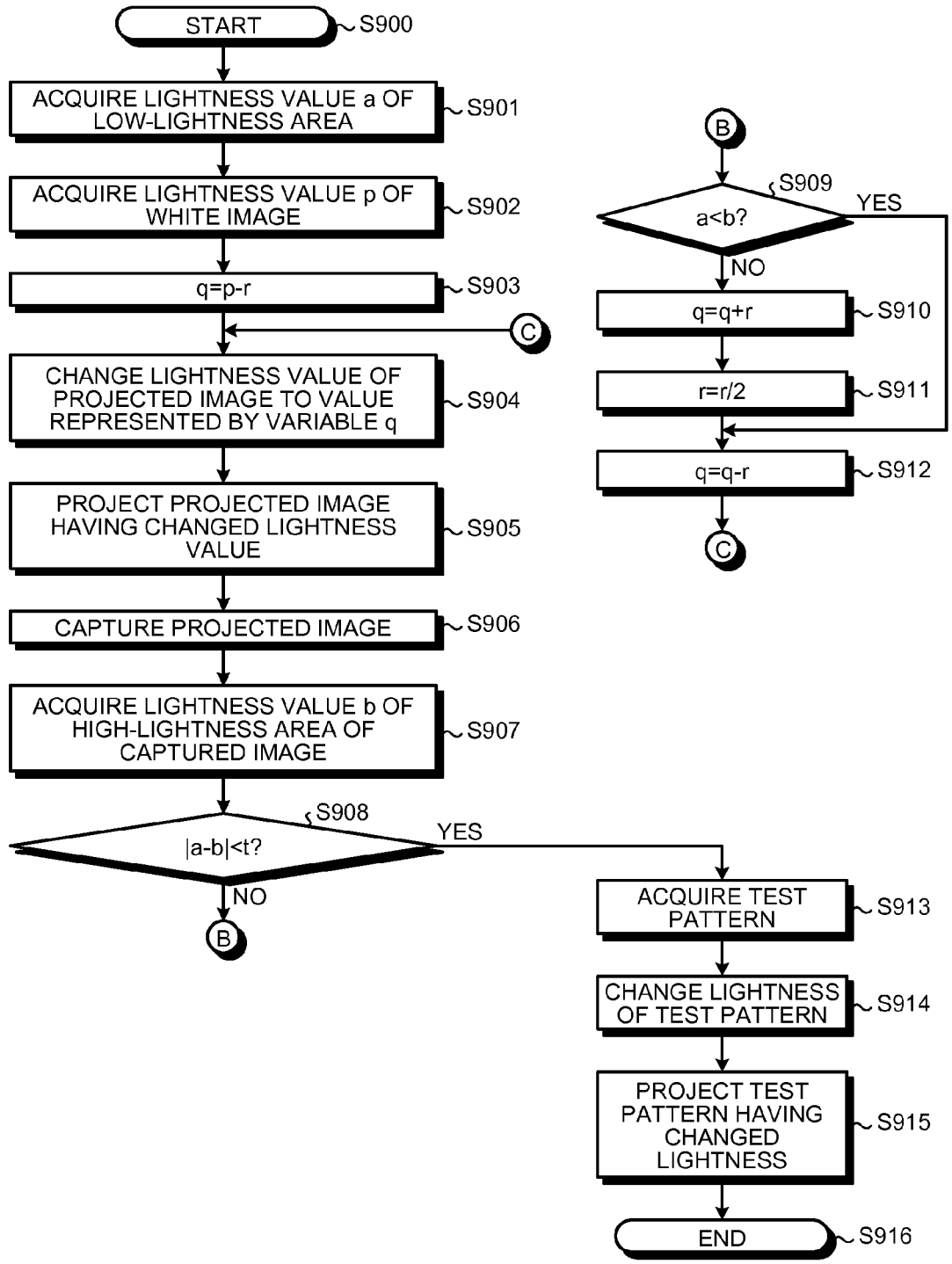
FIG. 9 is a flow chart illustrating a process in which the image processing apparatus illustrated in FIG. 1 corrects the lightness of a projected image.

FIG. 9 is a flow chart illustrating the process in which the image processing apparatus 100 illustrated in FIG. 1 corrects the lightness of the projected image. With reference to FIG. 9, description will be made below of the process executed at Step S304 illustrated in FIG. 3.

The process of FIG. 9 starts at Step S900, and at Step S901, the lightness corrector 118 acquires a lightness value a of the low-lightness area included in the captured image obtained by projecting the white image. At Step S902, the lightness corrector 118 acquires a lightness value p of the white image that is the projected image. At Step S903, the lightness corrector 118 substitutes, for a variable q, a value obtained by subtracting the value of a variable r from the lightness value p. In the present embodiment, any value in the range from 0 to 255 can be an initial value of the variable r whereas, in other embodiments, the initial value can be one of the values suitable for color representations of various data sizes.

At Step S904, the lightness corrector 118 changes the lightness value of the white image that is the projected image to a value represented by the variable q. At Step S905, the projector 104 projects the projected image having the changed lightness value onto the screen. At Step S906, the image capturing unit 106 generates the captured image by capturing an image of the screen, and the coordinate transformer 112 applies the projective transformation to the captured image. At Step S907, the lightness area identifying unit 114 removes noise from the captured image, then identifies the high-lightness area thereof, and then acquires a lightness value b thereof.

At Step S908, the lightness corrector 118 determines whether an absolute value of a difference between the lightness value a of the low-lightness area and the lightness value b of the high-lightness area of the captured image obtained at Step S906 is smaller than a predetermined threshold value t. In the present embodiment, it is preferable to set the predetermined threshold value t to a value by which the user cannot visually recognize the difference between the lightness value of the low-lightness area of the first captured image and the lightness value of the high-lightness area of the captured image obtained at Step S906.

If, in the determination at Step S908, it is determined that the absolute value of the difference between the lightness value a and the lightness value b is the threshold value t or more (No), the lightness corrector 118 determines, at Step S909, whether the lightness value a of the low-lightness area is smaller than the lightness value b of the high-lightness area of the captured image obtained at Step S906. If the lightness value a is determined to be smaller than the lightness value b (Yes), the process is branched to Step S912.

On the other hand, if the lightness value a is determined to be the lightness value b or more (No), the process is branched to Step S910. At Step S910, the lightness corrector 118 sets the value of the variable q to a value obtained by adding the value of the variable r to the value of the variable q. At Step S911, the lightness corrector 118 halves the value of the variable r. At Step S912, the lightness corrector 118 sets the value of the variable q to a value obtained by subtracting the value of the variable r from the value of the variable q, and executes the process of Step S904. With these steps, an appropriate lightness value of the high-lightness area can be derived even if, due to an excessively large value of the variable r, the lightness of the high-lightness area of the projected image having the changed lightness value becomes equal to or less than the lightness of the low-lightness area of the captured image of the white image that has been generated before the lightness value is changed.

On the other hand, if, in the determination at Step S908, it is determined that the absolute value of the difference between the lightness value a and the lightness value b is smaller than the threshold value t (Yes), the process is branched to Step S913. At Step S913, the projected image generator 116 acquires the test pattern from the test pattern storage unit 122. At Step S914, the projected image generator 116 changes the lightness of the test pattern by converting lightness values of all pixels constituting the test pattern at a ratio of q/p. At Step S915, the projector 104 projects the test pattern having the changed lightness, and the process is terminated at Step S916.

FIG. 10 is a diagram illustrating an example of the confirmation image to prompt the user for a response to the changes in the lightness of the projected image corrected by the image processing apparatus illustrated in FIG. 1. A confirmation image 1000 includes information 1010 that indicates a message prompting the user to judge whether to approve the lightness of the captured image and a method for the user to express the user's judgment. In the present embodiment, the user can express the user's judgment by depressing a predetermined operation button provided on the image processing apparatus 100.

Figure 11:
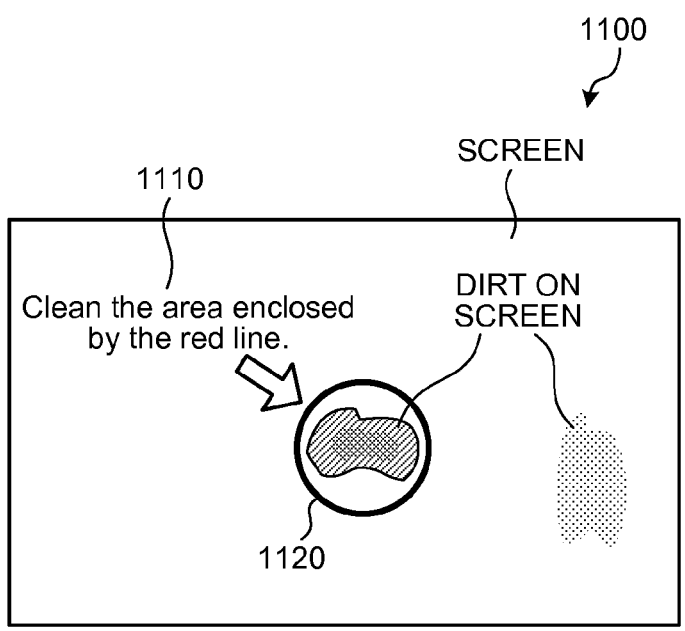
FIG. 11 is a diagram illustrating an example of a low-lightness area presenting image projected by the image processing apparatus.

FIG. 11 is a diagram illustrating an example of the low-lightness area presenting image projected by the image processing apparatus 100. A low-lightness area presenting image 1100 includes a message 1110 prompting the user to clean the member onto which an image is projected, such as a screen, and also includes a shape 1120 indicating the area whose lightness is reduced by dirt on the screen. Although, in the present embodiment, the area having the lowest lightness is presented as the low-lightness area, all areas having a predetermined lightness value or lower can be presented as the low-lightness area in other embodiments. In consideration of visibility of the user, it is preferable to display the message 1110 outside the area of the shape 1120.

Figure 12:
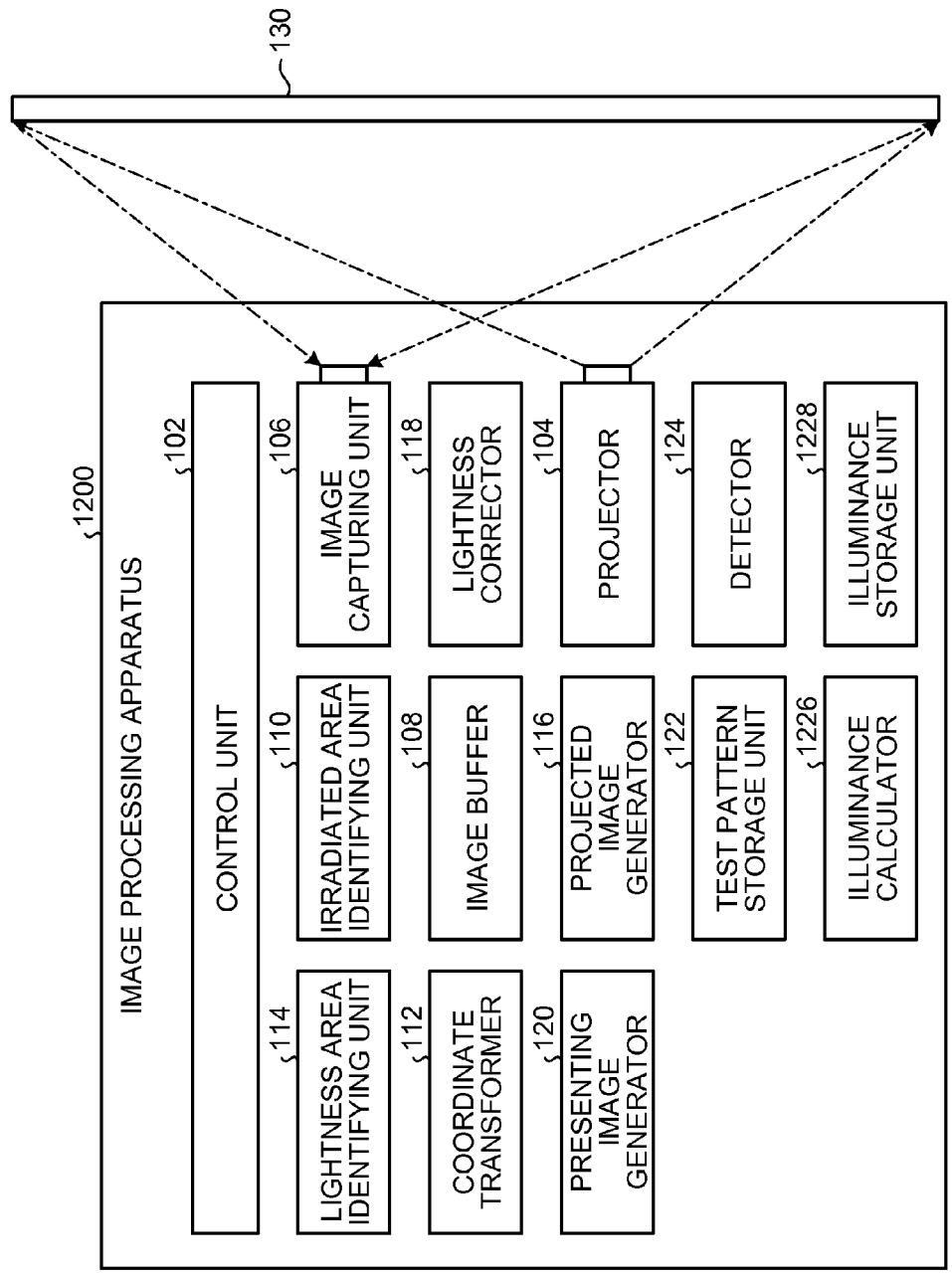
FIG. 12 is a diagram illustrating a functional configuration of an image processing apparatus according to another embodiment of the present invention.

FIG. 12 is a diagram illustrating a functional configuration of an image processing apparatus according to another embodiment of the present invention. The image processing apparatus 1200 has the same configuration as that of the image processing apparatus 100, and therefore, the description thereof will be made below mainly on different points.

The image processing apparatus 1200 is configured to include an illuminance calculator 1226 and an illuminance storage unit 1228 in addition to the functional modules included in the image processing apparatus 100.

The illuminance calculator 1226 is a functional module that calculates an illuminance of the projected image. The illuminance calculator 1226 acquires illuminances of the high-lightness area and the low-lightness area extracted by the lightness area identifying unit 114, and calculates candidates for illuminance (hereinafter termed "candidate illuminances") of light projected by the projector, and stores the candidates in the illuminance storage unit 1228. Specifically, the illuminance calculator 1226 can calculate a plurality of such candidate illuminances by using Equations (6) given below.

$$a_1 = a_0 + \Delta a$$

$$a_2 = a_0 + 2\Delta a$$

$$a_3 = a_0 + 3\Delta a$$

$$\ldots$$

$$a_{n-1} = a_0 + (n-1)\Delta a$$

$$a_n = a_z \qquad (6)$$

Here, $a_1$ to $a_n$ represent the candidate illuminances. Also, $a_0$ represents the illuminance of the low-lightness area, and $a_z$ represents the illuminance of the high-lightness area. Further, $\Delta a$ is a predetermined difference illuminance, and a value obtained by dividing the difference between the illuminance $a_z$ and the illuminance $a_0$ by n. Note that n is an arbitrary positive integer.

Figure 13:
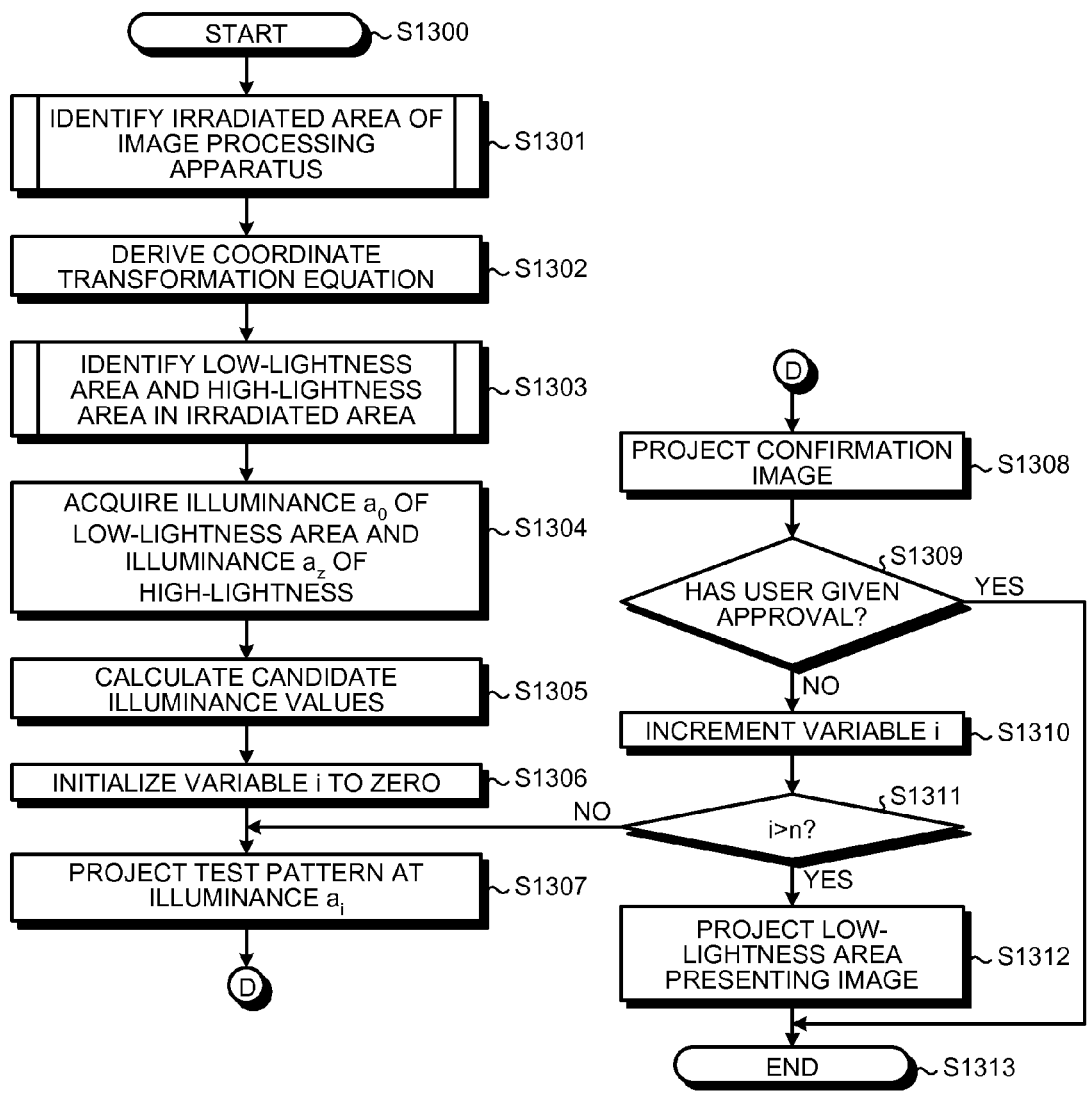
FIG. 13 is a flow chart illustrating a process executed by the image processing apparatus illustrated in FIG. 12.

FIG. 13 is a flow chart illustrating a process executed by the image processing apparatus illustrated in FIG. 12. With reference to FIG. 13, description will be made below of the process executed when the image processing apparatus 1200 corrects the lightness of the projected image.

The process of FIG. 13 starts at Step S1300, and at Step S1301, the control unit 102 of the image processing apparatus 1200 identifies the irradiated area of the irradiating light of the image processing apparatus 1200 by using the projector 104, the image capturing unit 106, the irradiated area identifying unit 110, and the lightness corrector 118.

At Step S1302, the control unit 102 calls the coordinate transformer 112, which derives the coordinate transformation equation by using the captured image generated by the image capturing unit 106 at Step S1301. At Step S1303, the control unit 102 calls the lightness area identifying unit 114, which identifies the low-lightness area and the high-lightness area in the irradiated area.

At Step S1304, the control unit 102 calls the illuminance calculator 1226, which in turn acquires the illuminance $a_0$ of the low-lightness area and the illuminance $a_z$ of the high-lightness area. At Step S1305, the illuminance calculator 1226 calculates multiple candidate illuminances by using the illuminance $a_0$ of the low-lightness area and the illuminance $a_z$ of the high-lightness area.

Figure 14:
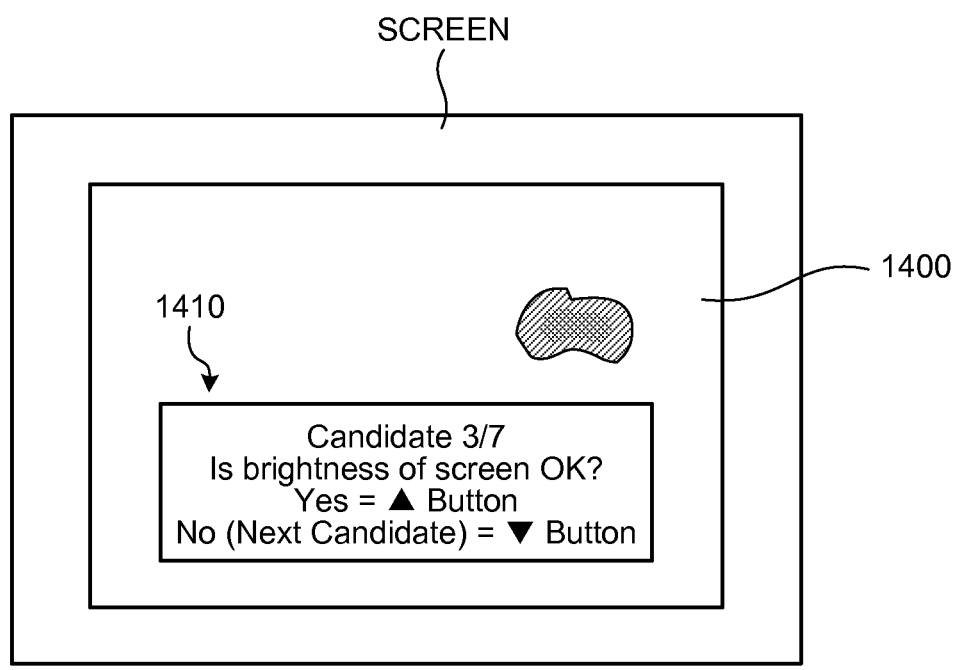
FIG. 14 is a diagram illustrating an example of a confirmation image projected by the image processing apparatus illustrated in FIG. 12.

At Step S1306, the control unit 102 initializes a variable i to zero. At Step S1307, the control unit 102 projects a test pattern at an illuminance $a_i$ by using the projected image generator 116, the lightness corrector 118, and the projector 104. At Step S1308, the control unit 102 projects a confirmation image as illustrated in FIG. 14 by using the projector 104 and the projected image generator 116.

At Step S1309, it is determined whether the detector 124 has received an instruction that the user has approved the illuminance of the projected image projected at Step S1308. If the detector 124 has received the instruction that the user has approved the illuminance (Yes), the process is terminated at Step S1313. On the other hand, if the detector 124 has not received the instruction that the user has approved the illuminance (No), the control unit 102 increments the variable i at Step S1310. At Step S1311, the control unit 102 determines whether the variable i is larger than n. If the variable i is n or less (No), the process is returned to Step S1307. On the other hand, if the variable i is larger than n (Yes), the process is branched to Step S1312.

At Step S1312, the control unit 102 calls the projected image generator 116, which generates, in cooperation with the presenting image generator 120, a low-lightness area presenting image, and the projector 104 projects the image. Then, the process is terminated at Step S1313.

In the embodiment illustrated in FIG. 13, the test patterns are projected in the order from the lowest to the highest illuminance as described above. With this method, the image can be projected not only at an illuminance at which the dirt on the screen completely disappears, but also at an illuminance at which a higher lightness level is obtained with slight dirt remaining. In other embodiments, the test patterns may be projected in the order from the highest to the lowest illuminance, and the image may be projected at an illuminance desired by the user.

In the present embodiment, the process is executed such that the control unit 102 waits for an instruction that the user has approved an illuminance. However, in other embodiments, the process may be as follows: If there is no instruction that the user has approved an illuminance within a certain period of time, the projected image is automatically projected at another illuminance, and when an instruction that the user has approved the illuminance is received, the illuminance at that time is employed as the illuminance at which the image processing apparatus 1200 projects the image.

FIG. 14 is a diagram illustrating an example of the confirmation image projected by the image processing apparatus 1200 illustrated in FIG. 12. A confirmation image 1400 illustrated in FIG. 14 is generated by the projected image generator 116. The confirmation image 1400 displays information 1410 that includes a message prompting the user to judge whether to approve the lightness of the captured image and a method for the user to express the user's judgment. The confirmation image 1400 also displays a numerical value "3" (=i+1) indicating the candidate illuminances of currently projected light and a numerical value "7" (=n+1) indicating the total number of the candidate illuminances.

In the above-described embodiment, the above-described functions are implemented in the image processing apparatus 100, whereas in other embodiments, the above-described functions can be implemented in an information processing apparatus such as a PC. In this case, the information processing apparatus can project and capture various images by using a projection device, such as an externally connected projector, and an image capturing device, such as a digital camera.

The information processing apparatus is equipped with any of a variety of processors such as a Pentium (registered trademark) processor or a compatible processor, and executes a computer program of the present invention written in a programming language such as an assembly language, C, C++, Java (registered trademark), JavaScript (registered trademark), Perl, Ruby, or Python, under the management of an OS such as Windows (registered trademark), Mac OS (registered trademark), Unix (registered trademark), or Linux (registered trademark). The information processing apparatus also includes, for example, a RAM that provides an execution space for running the program of the present invention and a hard disk device for storing, for example, the program and data in a long-lasting manner, and implements the above-described functional modules in the information processing apparatus by executing the program of the present invention.

The program of the present invention can be distributed by being stored in a device-readable recording medium, such as a hard disk drive (HDD), a compact disc read-only memory (CD-ROM), a magneto-optic disc (MO), a flexible disk, an electrically erasable programmable read-only memory (EEPROM), or an erasable programmable read-only memory (EPROM), and can also be transmitted via a network in a format readable by other devices.

According to the embodiments, the image processing apparatus generates an image presenting the low-lightness area included in the captured image, and projects the generated image. With this configuration, the user can intuitively check whether the lightness correction is useful, and can also obtain information on dirt on the screen that cannot be dealt with by the correction processing. Thus, by prompting the user to clean the screen, it is possible to improve quality of the projected image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a processor configured to,
project an image;
capture the projected image to generate a captured image;
identify a high-lightness area and a low-lightness area of the captured image;
correct a lightness of the projected image in an iterative process by,
determining a first lightness of the low-lightness area of the captured image,
adjusting a lightness of the captured image,
projecting another image with the adjusted lightness,
capturing the other projected image with the adjusted lightness,
determining a second lightness of the high-lightness area of the captured other projected image, and
correcting the lightness of the projected image based on the determined first lightness and the determined second lightness such that upon completion of the iterative process the second lightness of the high-lightness area is adjusted to correspond to the first lightness of the low-lightness area, and
project the projected image having the corrected lightness and an image to prompt a user to provide an input indicating whether the changed lightness of the projected image is acceptable or not.

2. The image processing apparatus according to claim 1, wherein the processor is further configured to,
generate an image presenting the low-lightness area in the captured image, and
project the image presenting the low-lightness area.

3. The image processing apparatus according to claim 2, wherein the image presenting the low-lightness area includes a message to prompt the user to clean an area of a surface corresponding to the image presenting the low-lightness area, onto which the image is projected.

4. An image processing apparatus comprising:
a processor configured to,
projects an image;
capture the projected image to generate a captured image;
identify a high-lightness area and a low-lightness area of the captured image; and
determine a plurality of illuminances by using an illuminance of the high-lightness area and an illuminance of the low-lightness area, each of the plurality of illuminances being based on the illuminance of the low-lightness area to which an integer multiple of a difference illuminance is added, the difference illuminance being a value determined based on a number of the plurality of illuminances and a difference between the illuminance of the high-lightness area and the illuminance of the low-lightness area; and
project an image at one of the illuminances to prompt a user to provide an input indicating which one of the plurality of illuminances are acceptable for projecting the image.

5. The image processing apparatus according to claim 4, wherein the processor is further configured to,
generate an image presenting the low-lightness area in the captured image, and
project the image presenting the low-lightness area.

6. The image processing apparatus according to claim 5, wherein the image presenting the low-lightness area includes a message to prompt the user to clean an area of a surface corresponding to the image presenting the low-lightness area, onto which the image is projected.

7. A method performed by an information processing apparatus that processes image data, the method comprising:
projecting a white image;
capturing the projected image to generate a captured image;
identifying a high-lightness area and a low-lightness area of the captured image;
correcting a lightness of the projected image in an iterative process by,
determining a first lightness of the low-lightness area of the captured image,
adjusting a lightness of the captured image,
projecting another image with the adjusted lightness,
capturing the other projected image with the adjusted lightness,
determining a second lightness of the high-lightness area of the captured other projected image, and
correcting the lightness of the projected image based on the determined first lightness and the determined second lightness such that upon completion of the iterative process, the second lightness of the high-lightness area is adjusted to correspond to the first lightness of the low-lightness area, and
projecting the projected image having the corrected lightness and an image to prompt a user to provide an input indicating whether the changed lightness of the projected image is acceptable or not.

8. A non-transitory computer-readable recording medium with an executable program stored thereon, wherein the program instructs a processor of the information processing apparatus to perform the method according to claim 7.

* * * * *